No Printed Specification Ava
385X
J. REED.
MACHINE FOR ROLLING IRON, &c.
Patented July 15, 1802.
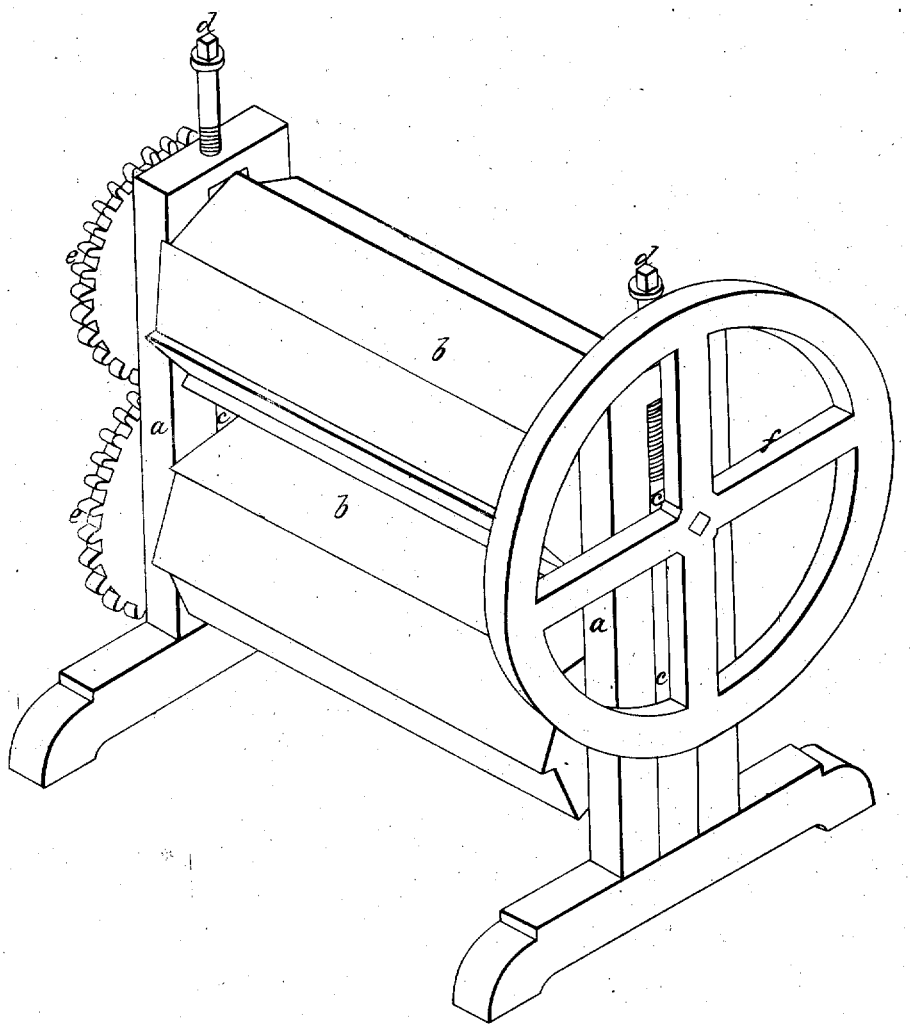

385X

Jesse Reed July 15, 1802
Letters Patent Dated July 15. 1802.

The schedule referred to in these Letters Patent and making part of the same containing a description in the words of the said Jesse Reed himself of his improvement being a method of rolling Iron or other metal for the purpose of making Nails. Description or specification of Jesse Reeds new invented method of rolling Iron or other metal for the purpose of making nails to wit. It consists of suitable rollers the surface of one or both of which is indented or made uneven which rollers are [illegible] and used in the common way of ---- mills for rolling iron or otherwise. the roller or rollers being more or less indented or made uneven in such a manner as to give the impression required according to the perfection to which the nails are designed to be brought in milling and according to their size length and kind, whether joining head to head or head to point, and with or without perfect heads after being slit and separated. By which method bars sheets or plates of iron copper or other metal, may be rolled drawn and milled into plates of different and of uneven thicknesses which when slit produce rods shaped into nails, joining end to end to be afterwards separated and headed if not done in the mill: and in this way by reason of the indenting or unevenness of the rollers nails and spikes of all sizes may be formed.

Witnessed by
Wm Folsom
Eben Odiorne

Jesse Reed

240 [illegible] ([illegible])